United States Patent

Mieslinger

[15] 3,648,137
[45] Mar. 7, 1972

[54] BRUSHLESS DIRECT CURRENT MOTOR

[72] Inventor: Winfried Mieslinger, Nurnberg, Germany

[73] Assignee: Gebr. Buhler Nachfolger GmbH, Nurnberg, Germany

[22] Filed: Mar. 30, 1970

[21] Appl. No.: 23,794

[30] Foreign Application Priority Data

Mar. 29, 1969  Germany.......................P 19 16 229.9

[52] U.S. Cl..............................................318/138, 318/254
[51] Int. Cl. .......................................................H02k 29/00
[58] Field of Search..........................................318/138, 254

[56] References Cited

UNITED STATES PATENTS 3,458,720  7/1969  Masel et al.........................318/138 X
3,475,668  10/1969  Mieslinger............................318/138
3,488,566  1/1970  Fukuda.................................318/138

*Primary Examiner*—G. R. Simmons
*Attorney*—Hane & Baxley

[57] ABSTRACT

In a transistor control circuit which comprises a number of control stages corresponding to the number of windings of a multipole stator, the control stages are joined together to form a closed chain, each control stage being connected to the following control stage by means of a first RC network, and being connected to the preceding control stage by means of a second RC network. The said first RC networks are all of uniform rating and the said second RC networks are also all of uniform rating but of a rating which differs from that of the first RC networks, and the first and second RC networks connected to the input of each control stage have a common resistance or capacity component.

4 Claims, 1 Drawing Figure

Patented March 7, 1972
3,648,137
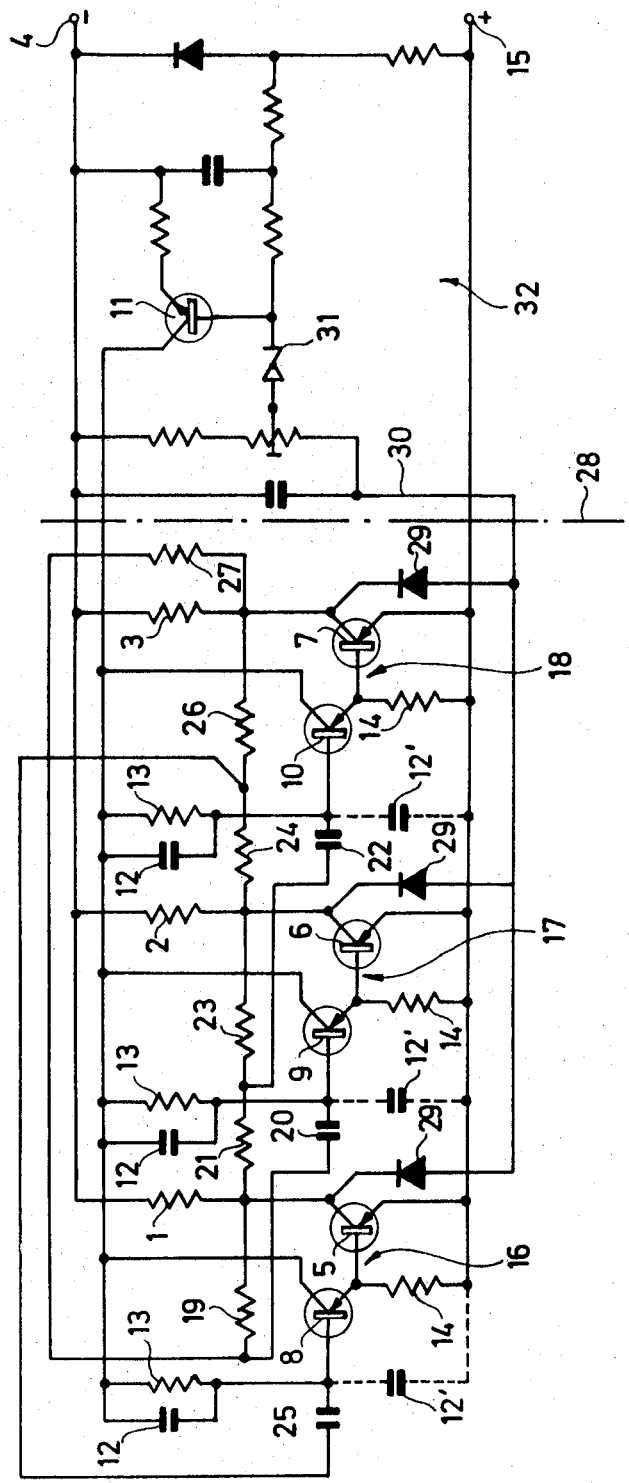
INVENTOR.
WINFRIED MIESLINGER
BY Hans Baylry and
Spicens
ATTORNEYS

BRUSHLESS DIRECT CURRENT MOTOR

BACKGROUND OF THE INVENTION

1. Field of the Invention

The invention relates to a brushless direct current motor having a magnet rotor and a multipole stator winding with a plurality of winding portions which are fed from a direct voltage source through a transistor control circuit which consists of a number of control stages equal to the number of winding portions, said control stages being joined together to form a closed chain and each of them containing at least one power transistor controlling the flow of current through the appertaining winding portion of the motor.

2. Description of the Prior Art

According to an earlier proposal, each control stage is connected through a first RC network of uniform rating to the following control stage and through a second RC network of uniform ratings, which however differ from those of the first RC networks, to the preceding control stage. Reliable starting of the direct current motor is thereby achieved in a simple manner without using additional aids.

SUMMARY OF THE INVENTION

The problem underlying the invention now consists in further simplifying the control circuit arrangement for the direct current motor.

According to the invention, this problem is solved by providing each two RC networks of different ratings, which are connected to the input of the same control stage, with a common capacitor or resistor.

Through this construction of the circuit the number of components used is thus reduced. This results on the one hand in a considerable simplification of the circuit arrangement, particularly when there is a large number of control stages, together with a corresponding saving in cost, while on the other hand the balancing of the circuit can be effected substantially more simply, since because of the use of a common capacitor or resistor the tolerance of the latter does not require balancing.

Further features, details, and advantages of the invention can be seen from the following description in conjunction with the drawing, in which one form of construction of a control circuit is illustrated.

DESCRIPTION OF THE PREFERRED EMBODIMENT

The stator winding of the motor has three winding portions 1, 2, 3, which, although this is not illustrated, are offset by 120° in relation to one another in each case over the periphery of the machine, similarly to a three-phase winding. The winding portions 1, 2, 3 are star-connected and their star point is connected to the minus pole 4 of a direct current source (not shown). Each winding portion 1, 2, 3 is disposed in the collector branch of respective power transistors 5, 6, 7, each of which is associated in a manner known in itself with a pretransistor 8, 9, 10 the emitter of which is connected to the base of the power transistor.

The collectors of the pretransistors 8, 9, 10 are connected to the collector of a transistor 11 of a regulating stage 32 serving to stabilize rotational speed. Between the base and the collector of each pretransistor 8, 9, 10 there is interposed a negative feedback network consisting of a capacitor 12 and a resistor 13. The emitters of the pretransistors 8, 9, 10 are connected in each case to the base of the appertaining power transistor 5, 6, 7 directly, while they are connected through a resistor 14 to the plus pole 15 of the direct voltage source. The emitters of the power transistors 5, 6, 7 are also connected directly to the plus pole 15. As indicated in broken lines in the circuit diagram, the capacitors 12 of the negative feedback networks could be replaced by the capacitors 12' interposed between the base and the plus pole of the direct voltage source.

In each case a power transistor 5, 6, 7 together with the appertaining pretransistor 8, 9, 10 and the above-mentioned capacitors and resistors 12, 13, 14 forms a control stage 16, 17, 18 acting as amplifier, all control stages being approximately identical.

The output of each of the control stages 16, 17, 18 is connected in each case by two RC networks of different ratings to the inputs of the other two control stages. In the arrangement illustrated the circuit is so arranged that the collector of the power transistor 5 of the control stage 16 is connected by way of the resistor 19 and the capacitor 20 to the base of the pretransistor 9 of the control stage 17. At the same time a connection is made by way of the resistor 21 and the capacitor 22 to the base of the pretransistor 10 of the control stage 18.

Similarly, the collector of the power transistor 6 of the control stage 17 is connected through the resistor 23 and the capacitor 22 to the base of the pretransistor 10 of the control stage 18, and by way of the resistor 24 and the capacitor 25 to the base of the pretransistor 8 of the control stage 16. Finally, between the collector of the power transistor 7 of the control stage 18 and the base of the pretransistor 8 of the control stage 16 there are interposed the resistor 26 and, in series therewith the capacitor 25, while the collector of the power transistor 7 is coupled through the series connection comprising the resistor 27 and the capacitor 20 to the base of the pretransistor 9 of the control stage 17.

The resistors 19, 21, 23, 24, 26, 27 and the capacitors 20, 22, 25 are so selected that the output of the control stage 16 is connected to the input of the control stage 17, the output of the control stage 17 to the input of the control stage 18, and the output of the control stage 18 to the input of the control stage 16, through RC networks of uniform ratings. At the same time the output of the control stage 16 is connected to the input of the control stage 18, the output of the control stage 18 to the input of the control stage 17, and the output of the control stage 17 to the input of the control stage 16 likewise through RC networks of uniform ratings, which however differ from that of the first RC networks.

The control stages are thus doubly connected by the RC networks to form a closed ring circuit, namely once in the sequence "control stage 16–17–18–16" and secondly in the switching sequence "control stage 16–18–17–16."

The circuit arrangement thus constitutes a three-stage multivibrator. The relaxation frequency of the multivibrator is determined by the magnitude of the RC networks. By suitable selection of the resistors 19, 21, 23, 24, 26, 27 and capacitors 20, 22, 25 of the RC networks it is possible to ensure that only one control stage 16, 17, 18 at a time is switched in such a manner that current flows through the appertaining winding portion 1, 2, 3. The resistors and capacitors of the RC networks are for example selected so that the time constants of the different RC networks are approximately in the proportion 1:2.

The essence of the invention now resides in that in each case the two RC networks of different ratings which are connected to the input of the same control stage are provided in the exemplified embodiment with a common capacitor. Thus, the input of the control stage 16 is connected through the RC network consisting of the capacitor 25 and the resistor 24 to the output of the control stage 17 and through the RC network consisting of the capacitor 25 and the resistor 26 to the output of the control stage 18. Similarly, the input of the control stage 17 is connected to the outputs of the control stages 16 and 18 through the capacitor 20 and the resistor 19 and 27 respectively, while through the capacitor 22 and the resistors 21 and 23 the input of the control stage 18 is connected to the outputs of the control stages 16 and 17. The capacitors 20, 22, and 25 are thus in each case a part of two RC elements of different ratings. The circuit could naturally also be so arranged that two RC networks of different ratings are in each case provided with a common resistor, each RC network having its own capacitor.

The mode of operation of the control circuit is as follows: After a direct current voltage has been applied to the poles 4 and 15, one of the control stages 16, 17, 18 is switched because of circuit asymmetries in such a manner that a current flows through one of the winding portions 1, 2, 3. The rotor (not shown) of the motor is at this moment in any angular position and is aligned in the shortest way by the portion in circuit, that is to say in or oppositely to the required direction of rotation. Through the angular movement the rotor induces in the winding portion 1, 2, 3 corresponding to the angular position a voltage pulse which through the appertaining two RC networks of different ratings is fed to the preceding and following control stages. For example, a voltage pulse induced in the winding portion 1 is fed by way of the resistor 19 and capacitor 20 to the control stage 17 and by way of the resistor 21 and capacitor 22 to the control stage 18. Through the different ratings of the RC elements it is thereby achieved that in each case the voltage pulse is first fed to the following control stage 17 and then to the preceding—78 or in the case of the exemplified embodiment to the next but one control stage 18, so that the control stage 17 is brought into circuit first and thus current flows through the winding portion 2, while at the same time the control stage 18 is so switched that no current can flow through the winding portion 3.

In the example of embodiment illustrated voltage pulses are induced in the winding portions 1, 2, 3 which in each case are offset in phase by 120° in relation to one another. It will for example be assumed that on starting the winding portion 2 is brought into circuit while the other two portions are without current. Since the motor rotates in the direction 1–2–3–1, the phase of the voltage of portion 1 leads that of portion 2 by 120°, that is to say moves in the direction of the negative peak value. The control stage 18 is thus brought into the conductive condition by the RC network 22, 23, the negative feedback capacitor effecting an additional retardation in certain circumstances. The RC network 19, 20 is ineffective in this case, because the control stage 17 is in any case switched on and is blocked only by the switching-on of the control stage 18 by way of the RC network 20, 27. The operation is repeated similarly for the following winding portions and thus brings the motor up to speed, running in the predetermined direction. After the motor has been brought up to speed optimum motor properties are obtained if in the steady state the reduced voltage of the respective winding portion 1, 2, 3 effects the switching-on of the next control stage but one, namely 16, 17, 18 with a 60° phase displacement.

The motor thus works with two different operating conditions. During starting a three-phase sweep-rotating field is produced in a predetermined direction by self-excitation of the circuit, this field pulling the permanent magnet armature in synchronous steps of 120°. In steady state running the individual phases are switched through the RC networks by the voltages induced in the respective winding portions, so that the rotor is continuously subjected to a turning moment. While the motor is running up to speed there is a gradual transition from the first operating condition to the second, the relatively low-frequency relaxation oscillation of the multivibrator being replaced by the pulses induced in the windings.

The regulating element 32 shown in the circuit diagram on the right of the dot-and-dash line 28 serves to regulate the speed of rotation. During the currentless half periods the voltage which is induced in the winding portions 1, 2, 3 and which is proportional to the rotational speed is decoupled through the diodes 29. The voltage applied to the line 30, which is proportional to the actual speed of rotation and is rectified by the diodes 29, is compared with a reference voltage corresponding to the desired rotational speed. The reference voltage is produced by means of a zener diode 31. The differential voltage between the voltage at the zener diode 31, corresponding to the desired rotational speed, and the voltage in the line 30, corresponding to the actual rotational speed, serves to operate the transistor 11 of a transistor amplifier. This transistor 11 is in the collector circuit of the pretransistors 8, 9, 10 and thus controls the collector current of the pretransistors 8, 9, 10. In this way the collector current is regulated by the pretransistors 8, 9, 10 in dependence on the differential voltage and thus on the actual rotational speed of the motor, which leads to a corresponding variation of the collector current by the power transistors 5, 6, 7, that is to say the current through the winding portions 1, 2, 3. At the same time the arrangement is such that in the case of excessive speed of rotation the collector current is reduced by the power transistors, which leads to a reduction of the speed of rotation.

Another advantage of the direct current motor according to the invention is to be seen in the fact that its direction of rotation could be achieved only by transposing the connections of the two appertaining but mutually different RC networks with the aid of a changeover switch. It would also be possible to change the direction of rotation by varying, in opposite directions, the resistors of the two RC networks having a common capacitor. This would for example be possible by using a potentiometer with a tapping instead of two separate resistors. A common resistor and a differential capacitor could equally well be used.

The number of winding portions and accordingly the number of stages in the control circuit are not restricted to three. With a larger number of winding portions it is merely necessary to vary the ratings of the RC networks, and consequently their phase displacement.

Instead of the permanent magnet rotor of the brushless direct current motor according to the invention it is also possible to use an electromagnet rotor, without this having any decisive influence on the essence of the invention.

What is claimed is:

1. A drive circuit for a brushless direct current motor having a permanent magnet rotor and a multipole stator winding with a plurality of winding portions comprising a two-terminal direct current source, means for connecting one terminal of said direct current source to one end of each of said winding portions, a plurality of transistor control stages, each associated with a different one of said winding portions, each of said control stages having an input terminal, and an output terminal and a common terminal, each of said common terminals being connected to the other terminal of said direct current source, means for connecting each of said output terminals to the other end of a different one of said winding portions, respectively, a plurality of first RC element networks having a first rating wherein each first network connects an output terminal of a control stage to an input terminal of the following control stage, a plurality of second RC element networks having a second rating wherein each second network connects an output terminal of a control stage to an input terminal of the preceding control stage whereby said control stages form a closed chain, each of the networks which are connected to the input terminal of the same control stage having a common element, a regulator stage having an input connected to the output terminals of at least some of said control stages and an output, and at least one feedback network for connecting the output of said regulator stage to the input terminal of at least one of said control stages to regulate the current flow through said control stage and consequently the speed of rotation of said motor.

2. The drive circuit of claim 1 wherein each of said control stages comprises two interconnected transistors, the emitters of both transistors being connected to said common terminal, the base of one of said transistors being connected to said input terminal, and the collector of the other of said transistors being connected to said output terminal.

3. The drive circuit of claim 2 wherein diodes connect the output terminals of said control stages to the input of said regulator stage.

4. The drive circuit of claim 3 wherein each of said feedback networks comprises a resistor and a capacitor.

* * * * *